United States Patent [19]

Whiteman

[11] Patent Number: 5,547,336
[45] Date of Patent: Aug. 20, 1996

[54] MAGAZINE RELEASE ASSEMBLY

[75] Inventor: Ronald Whiteman, Crosby, Minn.

[73] Assignee: Riverwood International Corporation, Atlanta, Ga.

[21] Appl. No.: 536,079

[22] Filed: Sep. 29, 1995

[51] Int. Cl.⁶ .................................................. B65G 59/04
[52] U.S. Cl. ........................ 414/798.9; 271/105; 271/165; 271/169
[58] Field of Search .................................. 271/31.1, 104, 271/105, 165, 166, 169; 414/798.9; 221/251; 493/316, 478

[56] References Cited

U.S. PATENT DOCUMENTS

| Re. 21,489 | 6/1940 | Kleineberg et al. | 271/31.1 X |
|---|---|---|---|
| 3,403,903 | 10/1968 | Crail | 271/104 X |
| 3,630,513 | 12/1971 | Davidson, Jr. et al. | 270/53 |
| 3,675,389 | 7/1972 | Uline | 53/183 |
| 4,149,452 | 4/1979 | Talarico | 93/51 M |
| 4,293,365 | 10/1981 | Geyser et al. | 156/364 |
| 4,348,853 | 9/1982 | Morse et al. | 493/316 X |
| 4,690,395 | 9/1987 | Nowicki | 271/31.1 X |
| 4,696,715 | 9/1987 | Bahr | 156/568 |
| 4,809,482 | 3/1989 | Horton et al. | 53/131 |
| 4,878,337 | 11/1989 | Raudat et al. | 53/534 |
| 5,249,916 | 10/1993 | Portrait et al. | 414/798.9 |

*Primary Examiner*—Karen Merritt
*Assistant Examiner*—Janice L. Krizek
*Attorney, Agent, or Firm*—Anthony G. Eggink

[57] ABSTRACT

An article release assembly mounted on the from or exit end of an article supply magazine. The article release assembly is for use in feeding successive thick or heavy rigid articles from an article supply magazine. The article release assembly cooperates with an article transfer assembly and comprises an upper magazine clip assembly and a lower magazine clip assembly which cooperate to shift upward the next-out article from the article stack in the magazine. The upper clip assembly has an elongated body with an upwardly extending retention slot having specified dimensions. The lower clip assembly has an elongated body with an upwardly extending terminal end having a rounded portion. The retention slot of the upper clip assembly and the rounded portions of the lower clip assembly cause the first or next-out article to be repositioned with respect to the article stack as the article transfer assembly transfers successive articles from the article stack in the magazine.

20 Claims, 11 Drawing Sheets

5,547,336

MAGAZINE RELEASE ASSEMBLY

BACKGROUND OF THE INVENTION

This invention relates to a magazine assembly for storing and feeding articles to an article transfer mechanism. Particularly, this invention relates to a magazine release assembly to position and release rigid articles to an article transfer mechanism from the pickup end of an article magazine assembly.

Magazine assemblies are commonly utilized in various manufacturing and packaging processes to store and dispense articles or objects. Magazine assemblies may be gravity fed or powered and are designed to maintain a stack of articles therein, for example, and, thereby, are used to ensure that a constant supply of articles is available at the pickup end of the magazine. These magazine assemblies typically are used in conjunction with article pickup mechanisms to transport successive articles from the magazine to a predetermined location for subsequent manipulation, such as for packaging purposes. For example, the pickup mechanisms may comprise vacuum cups extending from an article transport assembly which engage the first article in the magazine and which transports successive articles therefrom onto a moving conveyor.

Typically, magazine assemblies are provided with various stop members or retention structures which maintain the stack of articles in the magazine and which permit individual articles to be removed successively therefrom. The use of these retention structures have limits, however, and it has been found that large, heavy and/or rigid articles require a different approach to stop and release mechanisms, particularly in high speed operations.

Prior art magazine structures typically comprise an inclined base on which a stack of articles is held by retention clips which permit the removal of successive articles. The individual articles are typically engaged and pulled past the retention clips whereby each article or portions of the article flexes or bends during removal. This removal process, however, is limited to flexible articles and presents difficulties if rigid or heavy articles or objects are passed therethrough. For example, large game boards or plastic cases may be damaged or scuffed when pulled through a rigid clip retention system. If the clip systems are modified to flex, for example, such clip systems may not have the physical strength to hold back the gravity-fed stack of articles and to prevent them from falling through the magazine's exit end. The magazine release assembly of the present invention provides a means which overcomes the problems and difficulties exhibited by the retention systems of the prior art. And, as far as is known, such a magazine release assembly for use with rigid or relatively large and heavy articles has not been utilized or proposed in the art.

It is, therefore, an object of the present invention to provide a magazine release assembly for use in storing and feeding articles which are large in size and rigid in construction. Particularly, it is the object of the present invention to provide a magazine release assembly which results in the indexing of the first article for pickup from a magazine assembly as it is engaged for transfer therefrom. A further object is to provide a magazine assembly as well as a method of article removal which permit the movement of successive articles from the article stack through a vertically disposed transfer path and which permits the successive removal of large and rigid articles from a magazine so as to maintain the integrity of the article stack in the magazine.

SUMMARY OF THE INVENTION

An article release assembly which mounts onto the front or exit end of an article supply magazine. The article release assembly is particularly suited for storing and feeding thick or heavy rigid articles, such as game boards, rigid plastic cases or the like. The article release assembly cooperates with an article transfer assembly, such as a reciprocating or continuous motion placer device. The article release assembly comprises an upper magazine clip assembly and a lower magazine clip assembly which cooperate to shift upward the next-out article from the article stack in the magazine as it is engaged and transferred by the article transfer assembly.

The upper magazine clip assembly is comprised of at least one upper clip structure and a cooperating guide bar which is spaced a predetermined distance therefrom. The upper clip structure has an elongated body having an upwardly disposed retention slot and which is adjustably mounted to the magazine structure. The elongated body further has a terminating abutment surface. The upper surface of the retention slot, the abutment surface of the upper clip structure and the guide bar cooperate to form an upper article retention structure to capture the upper part of an article. The article release assembly further has at least one lower clip assembly for the adjustable mounting to the magazine structure. The lower clip assembly has an interiorly disposed rounded edge extending against the bottom of the article stack. Preferably, the upper clip assembly and the lower clip assembly are aligned at the exit end of the magazine structure. The rounded portions of the lower clip assembly and the retention slots of the upper clip assembly cause the first or next-out article to be indexed or repositioned from the article stack as the article transfer assembly transfers successive articles from the article stack in the magazine.

Further provided in the teachings of this invention are embodiments of the magazine release assembly as well as an article removal process for cooperating in the transfer of large, heavy and rigid articles from supply magazines having release assemblies.

These and other benefits of this invention will become clear from the following description by reference to the drawings.

DESCRIPTION OF THE PREFERRED EMBODIMENTS

Figure 1:
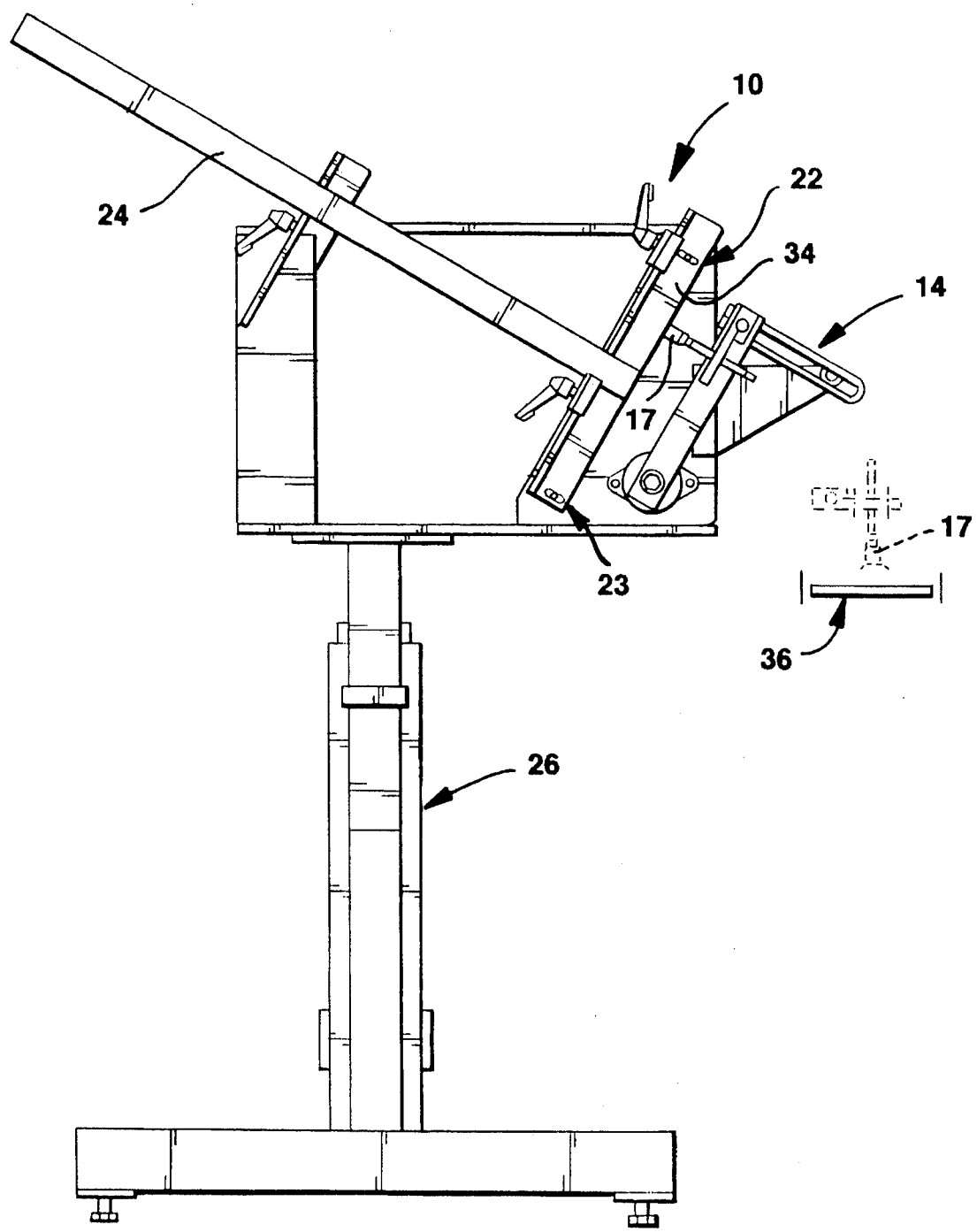
FIG. 1 is a lateral plan view of an assembly showing a magazine and a reciprocating article transfer device on a stand structure.
Figure 2:
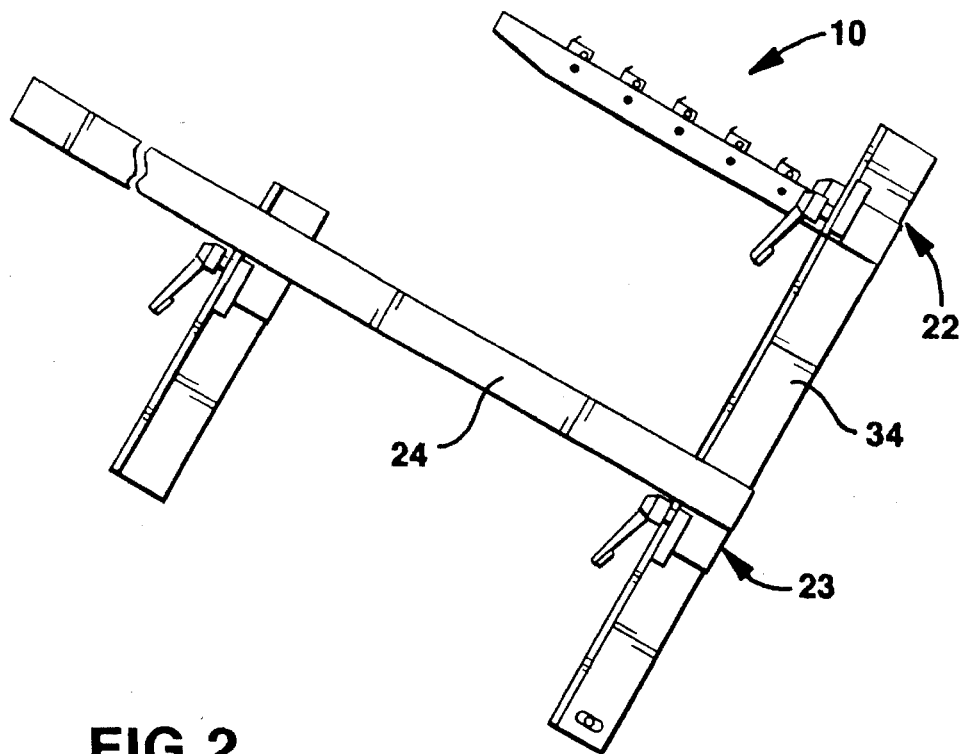
FIG. 2 is a lateral plan view of a magazine structure for storing and feeding articles.
Figure 3:
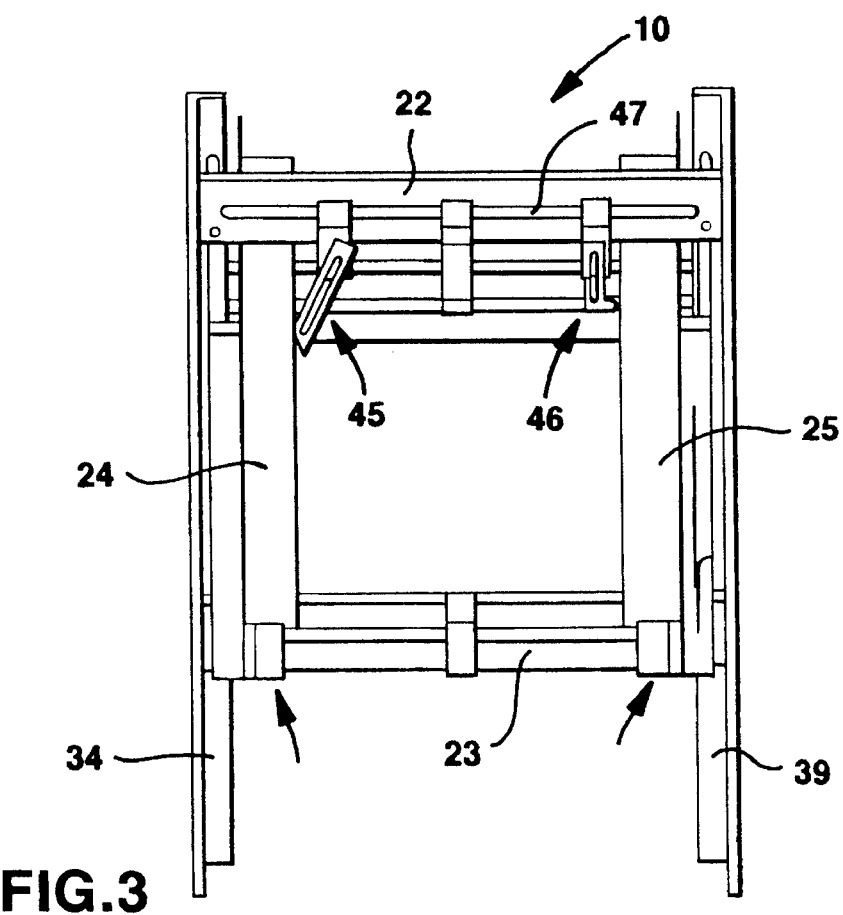
FIG. 3 is a frontal plan view of the magazine structure of FIG. 2.

Referring to FIGS. 1–3, an article magazine structure 10 is shown mounted on a floor stand 26 and is shown used in cooperation with an article transfer assembly 14. The magazine structure 10 is shown mounted at an angle as depicted by magazine rail 24, for example, at an angle of 30 degrees with respect to the horizontal work plane depicted in FIG. 1 by conveyor 36.

The magazine structure 10 is shown comprised of an exit end generally depicted by a peripheral rectilinear form as shown by support members 34 and 39, top magazine bracket 22 and lower magazine bracket 23. As will be further described, a vacuum cup 17 of article transfer assembly 14 may reciprocatingly or continuously transfer individual articles from the exit end of magazine 10 to a conveyor 36. For example, an article stack placed on magazine rails 24 and 25 is retained from gravitational forward movement by means of retention clips 45 and 46, for example, which are slidably adjustable via slot 47 of top bracket 22. A similar adjustable retention clip structure is mounted to lower bracket 23.

The general structures shown and described with respect to FIGS. 1–3 are particularly suited for the magazine release assembly of the present invention. For example, the utilization of typical prior art retention structures provide the use of rigid clip members mounted on opposing sides of top bracket 22 and lower bracket 23. As a vacuum cup 17 of article transfer assembly 14, for example, grasps the end or first article restrained by the upper and lower clip members, the article ends or periphery in contact with the clip members must flex to be transferred passed them. Although such retention and release is suitable for flexible articles, difficulties are presented when large, heavy and/or rigid articles are desired to be stored in and transferred from magazine 10. Such difficulties are also presented when the articles are inherently subject to scuffing or other damage.

Figure 4:
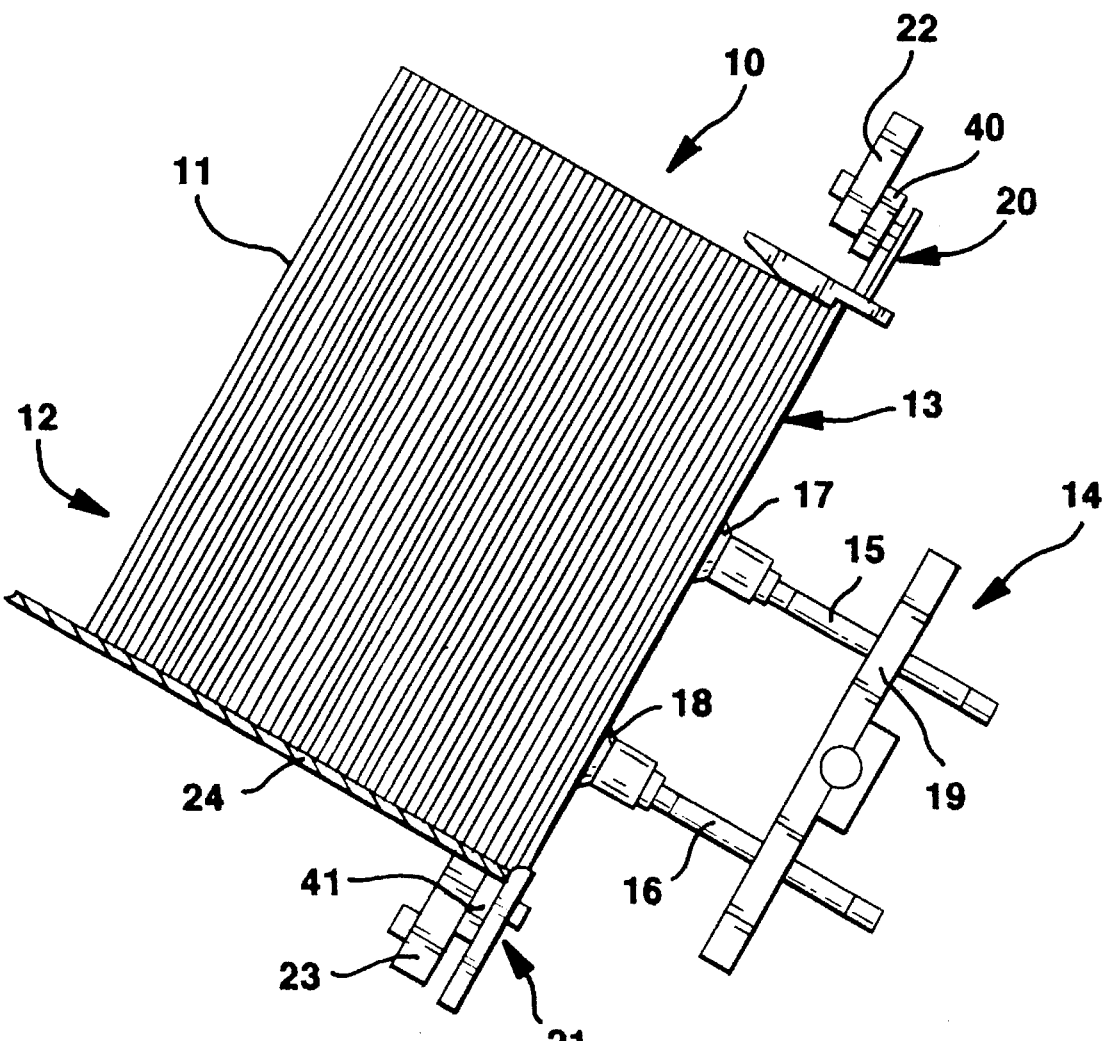
FIG. 4 is a lateral plan view showing the magazine structure with the article release assembly of this invention.
Figure 5:
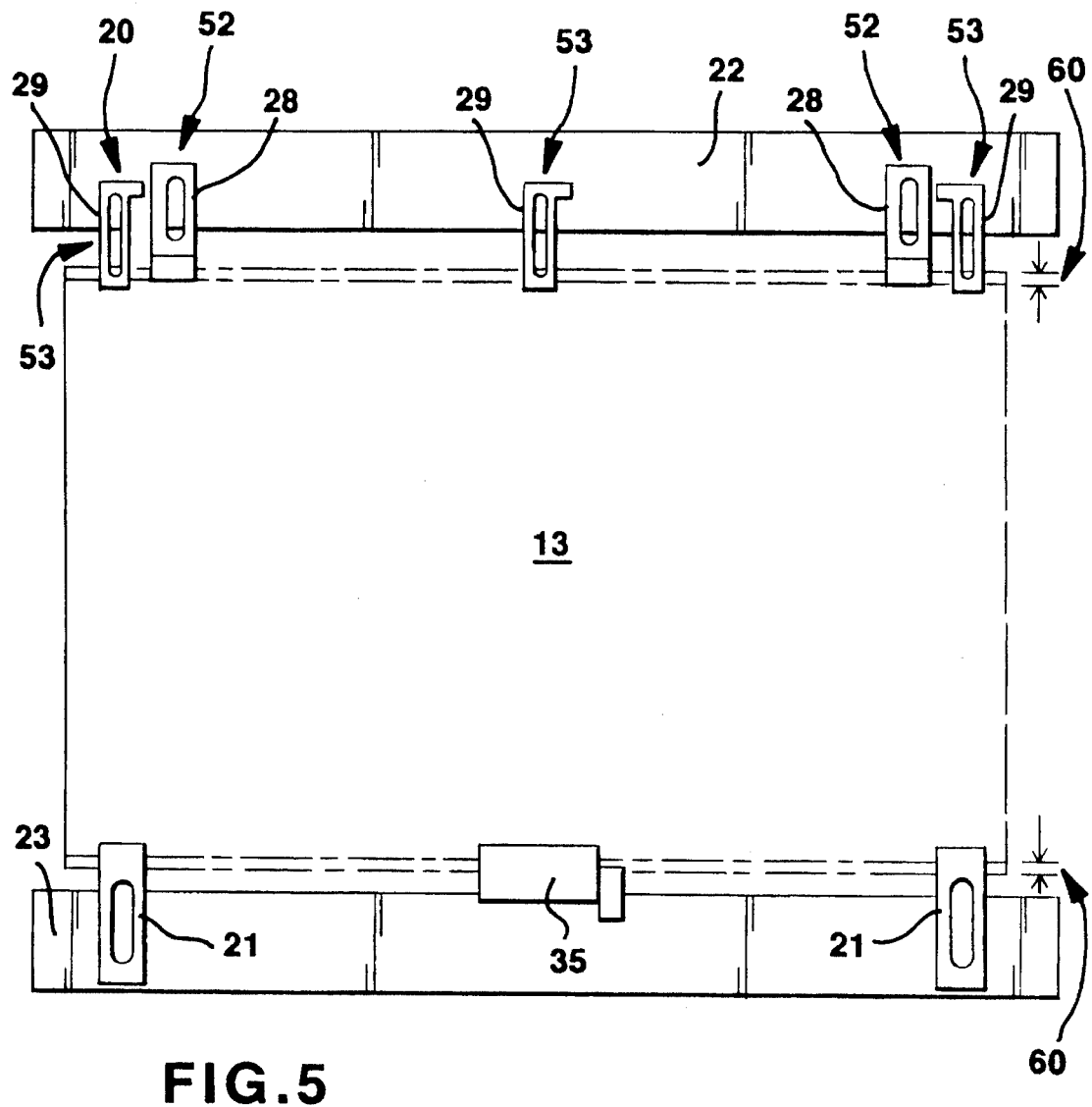
FIG. 5 is a frontal plan view of the magazine structure of FIG. 4.

Referring to FIGS. 4 and 5, an article stack 12, comprised of large or rigid individual articles 11, is shown positioned on inclined magazine rail 24 of magazine assembly 10. A magazine release assembly is shown comprised of upper clip assemblies 20 and lower clip assemblies 21. The number of upper clip assemblies 20 and the number of lower clip assemblies 21 utilized in conjunction with an article supply magazine 10 is dependent upon the size, configuration and weight of the articles 11. The magazine release assembly is shown retaining the front or first article 13 which is further shown being engaged by vacuum cups 17 and 18 of article transfer assembly 14. As shown more clearly in FIGS. 6 and 7, during removal of the front article 13, the bottom end of article 13 is shown moved in an upward manner with respect to the lower clip assembly 21 and also in an upward manner with respect to the upper clip assembly 20.

As further shown in FIGS. 4 and 5, the upper clip assembly 20 is mounted to the top magazine bracket 22 by means of a spacer device 40. Further, the lower clip assembly 21 is shown mounted to a lower spacer device 41 which is fixed to the lower bracket 23 of the magazine assembly 10. As will be further described, the respective clip assemblies 20 and 21 are adjustably mounted to the upper and lower magazine brackets 22 and 23 so as to accommodate varying article sizes and configurations. However, as shown, upper clip assemblies 20 and lower clip assemblies 21 are vertically aligned at the peripheral corners of the magazine exit end.

The article transfer assembly 14 is shown to have a vacuum stem holder 19 and a pair of vacuum stems 15 and 16 on which the vacuum cups 17 and 18 are mounted. The article transfer assembly 14 may be of a reciprocating motion type or it may be of the continuous motion type. In either case, the vacuum cups are arranged to contact the articles of article stack 12 in a manner to consistently engage, pick-up, transfer and release each article. Thus, depending upon the size, shape and weight of the articles to be transferred, the vacuum cup pattern may be changed to accommodate the particular nature and parameters of the article. Other clip or retention elements may also be utilized in conjunction with the article release assembly of the present invention. For example, FIG. 5 shows the use of a product roller 35 mounted at the bottom portion of the magazine assembly 10. The product roller 35 is aligned with the lower clip assemblies 21, which in this case, are shown mounted at the outside bottom corners of the magazine assembly 10. Further shown, is a clip structure 53 mounted to top bracket 22. The clip structure 53 is essentially a product clip 29 similar to that utilized in the upper clip assembly 20 of this invention. The clip structure 53 is shown horizontally aligned with the upper clip structures 29 of assembly 20 and vertically aligned with the product roller 35. Although one such structure 53 is shown, a greater number may be utilized depending upon the size, weight or configuration of articles 13.

Figure 6:
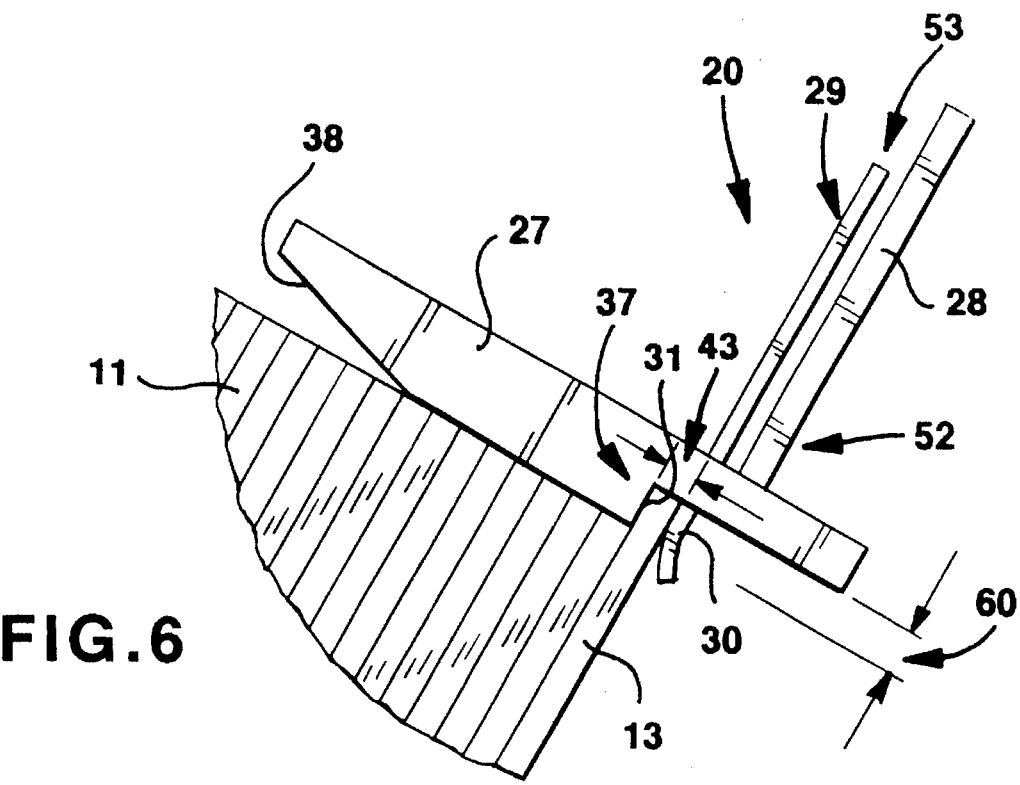
FIG. 6 is an enlarged side plan view of the upper clip structure of the article release assembly shown mounted on the magazine structure.

As shown in FIGS. 5 and 6, the upper clip assembly 20 is comprised of two cooperating elements. However, as would be evident to one skilled in the art, the two cooperating elements of the upper clip assembly 20 may be combined into one adjustable structure. First, an article retention structure 52 is shown having a product clip body 27 with a sloped rear portion 38 and a forward abutment surface 31. An adjustment bracket 28 is shown attached to the product clip body 27. As will be further described below, the bracket 28 permits the article retention structure to be adjustably mounted to the top bracket 22 of the magazine 10. In cooperation with the article retention structure, an upper clip structure 53 having a body 29 is utilized and which is also adjustably mounted to the top bracket 22 of magazine assembly 10. The product clip body 29 is shown to have a sloped or rounded terminal tip 30. Importantly, the distance 37 between the abutment surface 31 and the terminal end of product clip 29 is spaced to receive the upper end of successive first or next-out articles 13. The distance 37 is at least that of the article thickness 43 and this distance is preferably slightly greater than the article thickness 43.

Figure 7:
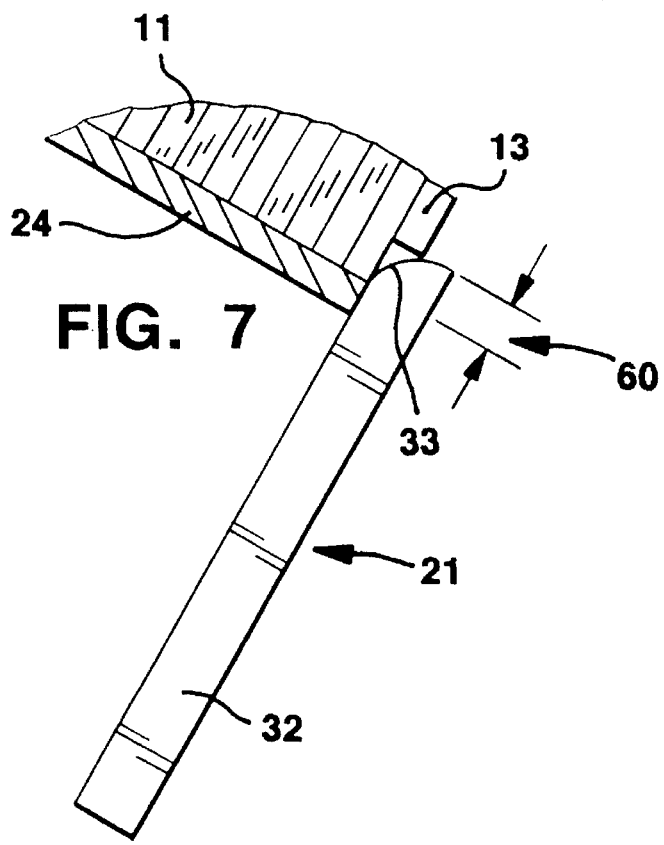
FIG. 7 is an enlarged side plan view of the lower clip structure shown in FIG. 4.

The abutment surface 31 is shown to have a predetermined distance 60. As shown in FIGS. 5, 6 and 7, the distance 60 represents the vertical movement of the first article 13 with respect to the article stack 12. And, accordingly, the upper clip assembly 20 and the lower clip assembly 21 are adjusted to provide for the movement of the articles for this predetermined distance 60. Preferably, the components of the upper clip assembly 20 are constructed of a polished stainless steel material or the like.

Used in cooperation with the upper clip assembly 20 is the lower clip assembly 21, as shown in FIG. 7. The upper rounded end 33 of the product clip 32 extends upwardly a predetermined distance to force the bottom ends of the successive articles upward and into the indentation 37 between the upper clip 29 and the product clip 27. The product clip body 32 is preferably constructed of a smooth nylon material, or the like.

Figure 8:
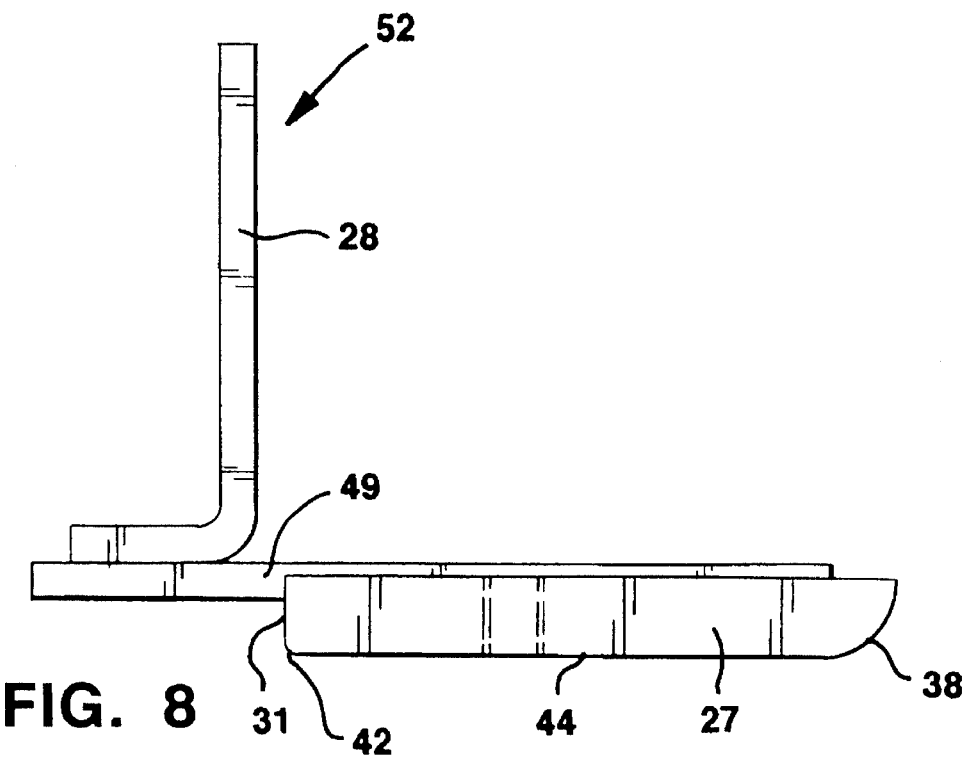
FIG. 8 is a lateral plan view of the upper clip structure of the upper clip assembly.
Figure 12:
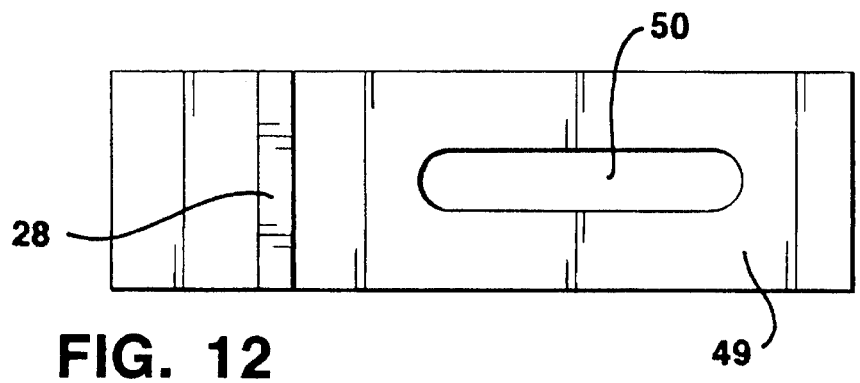
FIGS. 12–14 are top, side and frontal plan views, respectively, of the upper clip structure of FIG. 8.
Figure 13:
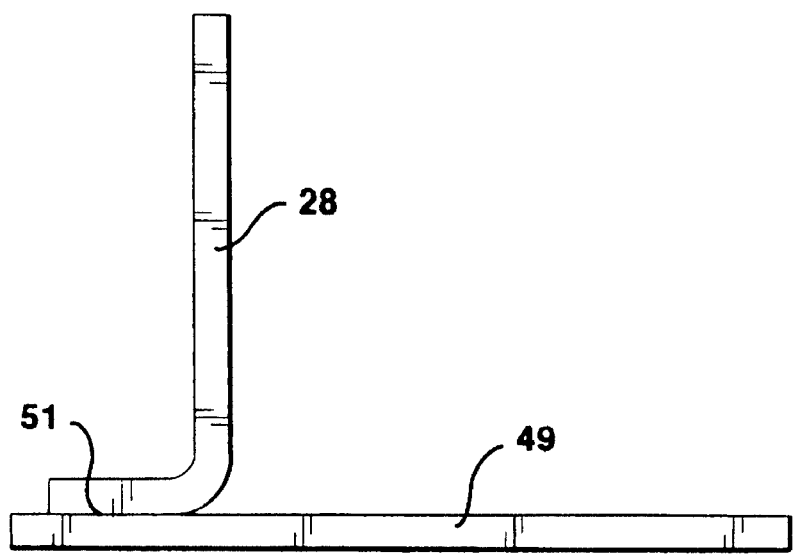
Figure 14:
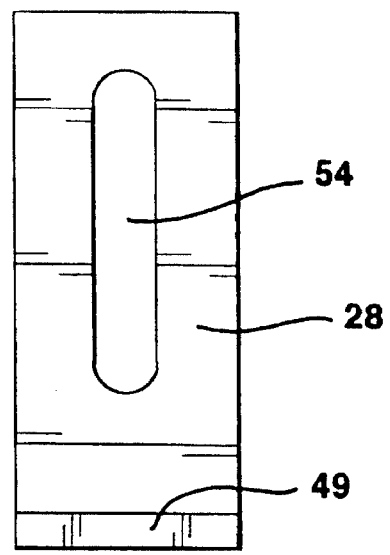
Figure 15:
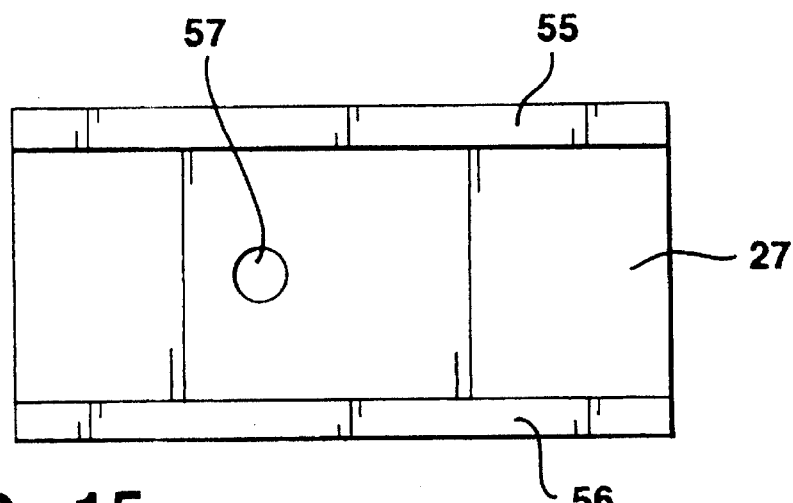
FIGS. 15–17 are top, side and end plan views, respectively, of an element thereof.
Figure 16:
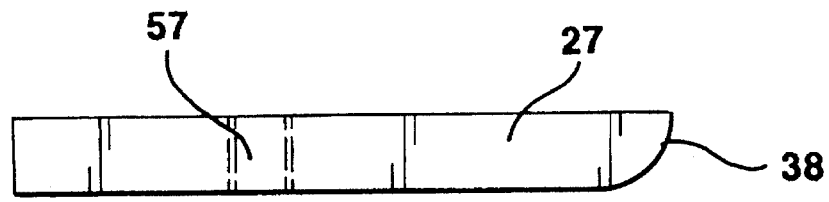
Figure 17:
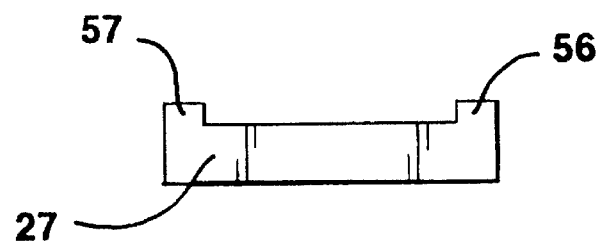

FIG. 8 is a lateral view of the upper retention structure 52 and which shows the abutment member 49 connected to the adjustment bracket 28. The abutment member 49 is adjustably fixed to member 27. The individual elements of the upper retention structure 52 are shown in FIGS. 12–17. FIGS. 12–14 show the top, side and frontal views of the adjustment bracket 28 and the abutment member 49 and which are shown joined at 51. FIG. 12 shows the abutment member 49 having an adjustment slot 50 and FIG. 14 shows the adjustment bracket 28 having an adjustment slot 54. FIGS. 15–17 show top, side and end views of the base member 27 which has opposing side extensions 55 and 56 which slidingly capture the abutment member 49 of FIGS. 12–14. The aperture 57 through base member 27 is aligned with the adjustment slot 50 of abutment member 49 so as to permit the adjustability and securement of the upper retention structure 52. The sloped rear portion 38 of the base member 27 permits the stack of articles to be guided and captured below the base member 27 as shown in FIG. 6, although therein the configuration of the sloped member is angled as opposed to being rounded. Either of the aforementioned configurations are suited for guiding the article stack beneath the base member 27.

As further shown in FIG. 8, the bottom surface 44 of base member 27 is provided to capture the sliding article stack 12 as the front articles 13 are removed. Thus, the article stack 12 is captured between the magazine rails 24 and 25 at the bottom of the magazine 10 and the bottom surface 44 of the base member 27 as the front articles 13 are sequentially removed. A rounded edge 42 at the intersection of the abutment surface 31 and the bottom surface 44 provides a smooth transition of the front articles 13 into the indentation slot 37 of the upper clip assembly 20. The edge 42 preferably has a slight radius and is preferably polished to aid in the movement of the top ends of the articles 13.

Figure 9:
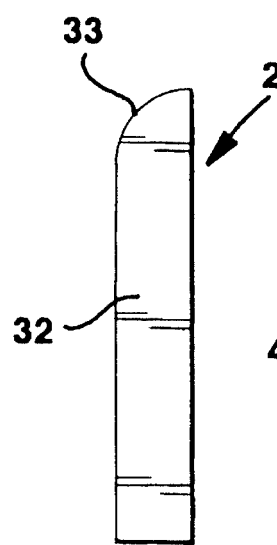
FIGS. 9–11 are lateral, frontal and rear plan views, respectively, of the lower clip assembly of the article release assembly.
Figure 10:
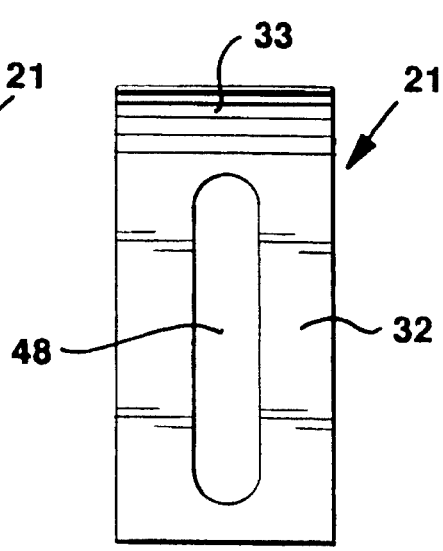
Figure 11:
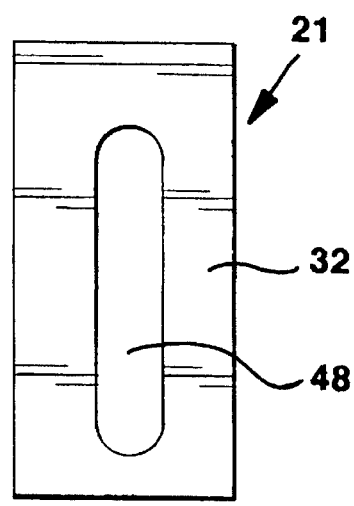

FIGS. 9–11 show side, front and rear views of the lower clip assembly 21. The lower clip assembly 21 is shown to have a body member 32 with a rounded end 33. An adjustment slot 48 is positioned in the body member 32 to permit the adjustable securement of the lower clip assembly to the lower bracket 23 of the magazine 10, as shown in FIG. 5.

In summary, the article release assembly of the present invention provides for the movement of successive first articles 13 from article stack 12. As shown, the movement of the article transfer assembly 14 causes each article 13 to move upwardly with respect to the article stack 12. The outward movement of articles 13 from the magazine assembly 10 is an upward and bottom-out pattern motion which permits the bottom portion of the article 13 to slide over the rounded ends 33 of the lower clip assemblies 21. Subsequently, the top portion of the article 13 is pulled from the indentation 37 which is defined by the abutment surface 31 of base member 27 and the rear surface of the cooperating upper product clip 29. The flexibility of the vacuum cups 17 permit the articles 13 to be moved in this transfer path while maintaining the integrity of the remaining article stack 12 in the magazine 10. It is also within the purview of this invention to provide a cooperating motion of an article transfer assembly to facilitate the transfer of articles 13 from a magazine in this transfer path manner. The latter permitting the use of non-flexible vacuum elements on an article transfer device and also to result in greater placement accuracy.

Figure 18:
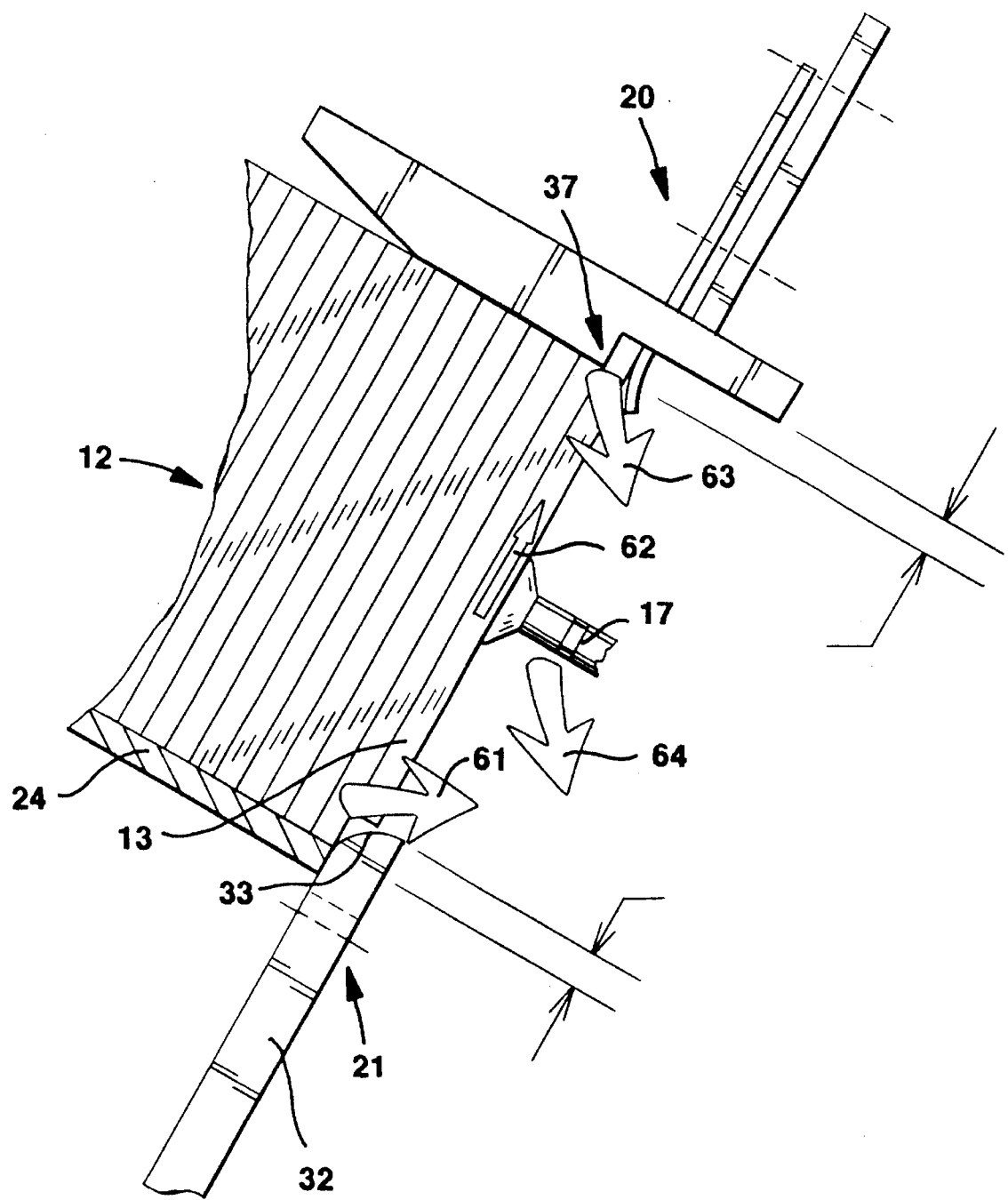
FIG. 18 is a lateral plan view of the article release assembly and showing the movement of an article removed from the magazine.

The operation of the magazine release assembly of this invention is shown in FIG. 18. The cross-sectional view of the magazine 10 shows the article stack 12 in a manner similar to that depicted in FIGS. 4, 6 and 7. As vacuum cup 17 of an article transfer assembly 14 engages the front or next-out article 13, a rigid plastic case, for example, a perpendicular outward pull or motion causes the bottom of article 13 to be slid or moved, as shown by arrow 61, along the inwardly disposed rounded end 33 of the lower clip assembly 21. Simultaneously, the article 13 is moved upward as indicated by arrow 62 whereby the upper end of the rigid article 13 is caused to be moved into and captured within indentation 37 of the upper clip assembly 20. The indentation or slot 37 is defined by the abutment surface 31 of base member 20 and the rear surface of the bottom end of the upper product clip 29.

The further outward movement of the vacuum cup 17, as shown by arrow 64, causes the bottom end of the rigid article 13 to be pulled over the top of the bottom product clip 32. Subsequently, the top of the rigid article 13 is free to be removed from the indentation 37 and is guided outwardly via the rear surface of the rounded or sloped terminal tip 30 of the upper product clip 29.

Figure 19:
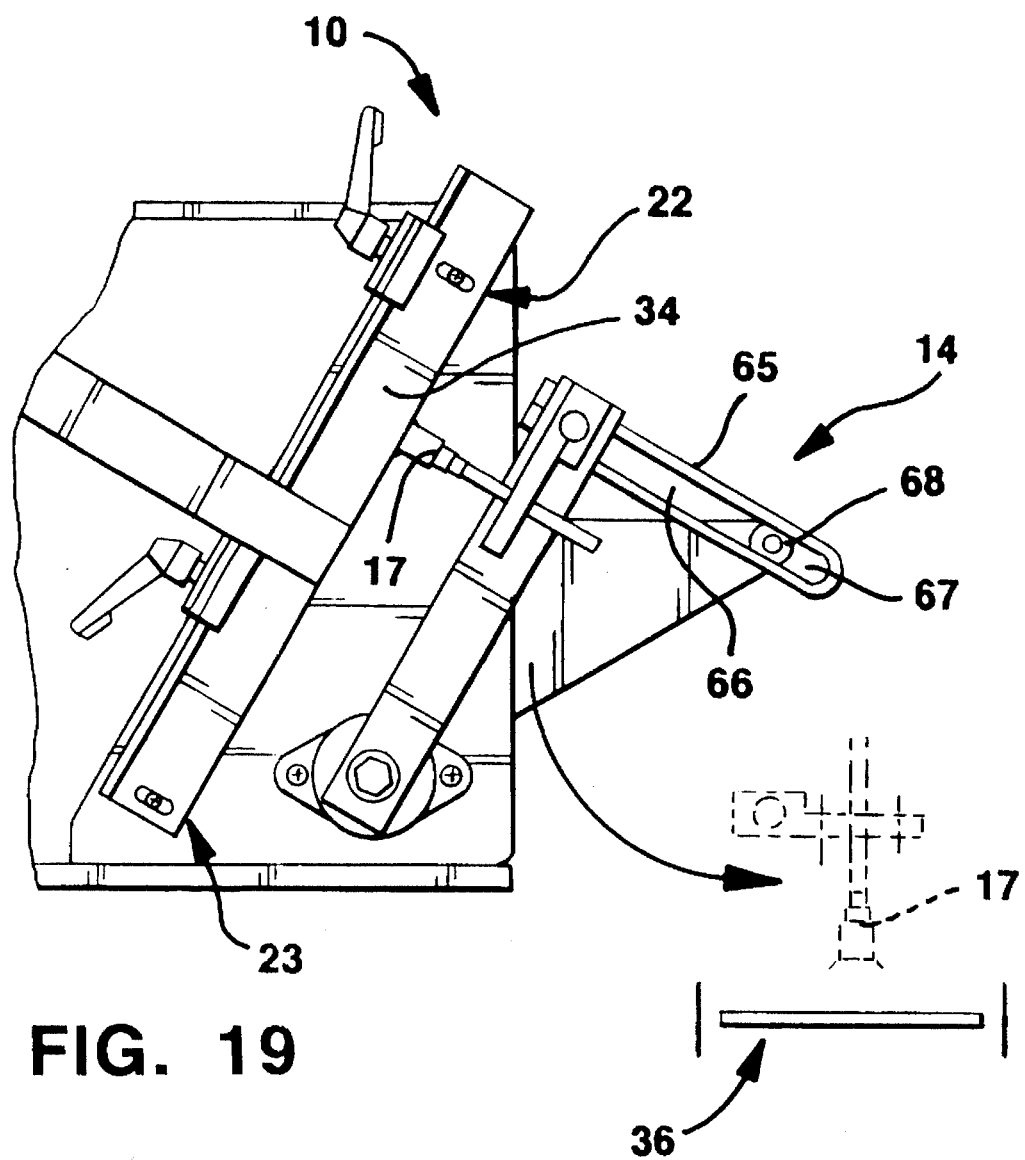
FIG. 19 is a lateral plan view showing the reciprocating article transfer device.
Figure 20:
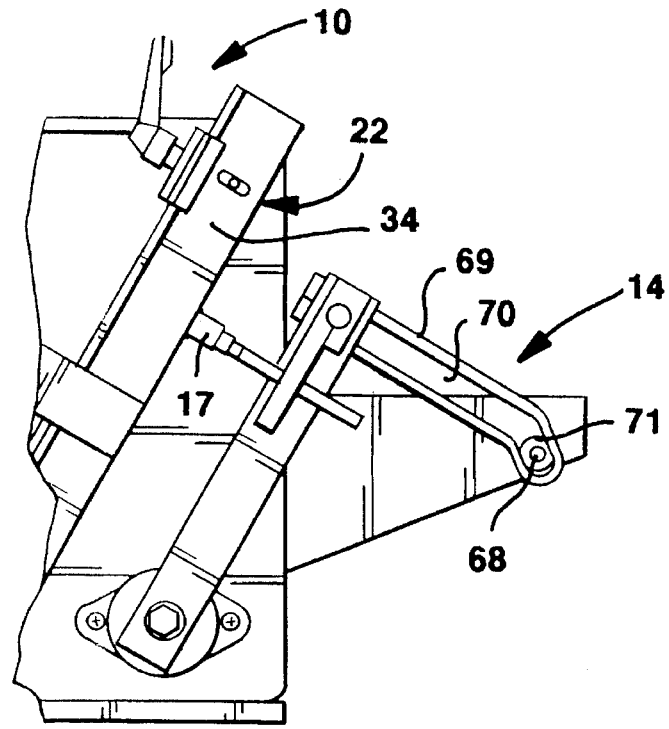
FIG. 20 is a lateral plan view showing an embodiment of the pivot arm of a reciprocating article transfer device.
Figure 21:
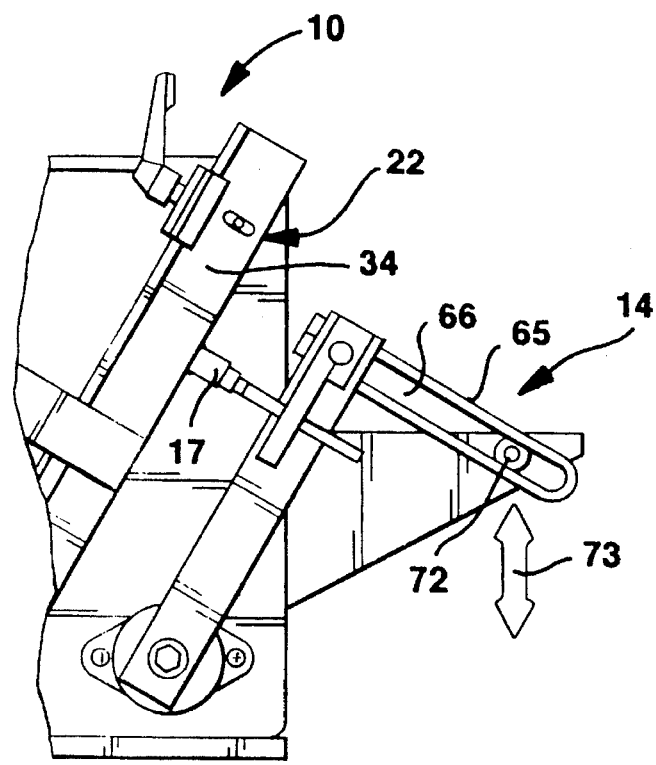
FIG. 21 is a lateral plan view showing another embodiment of the pivot arm of a reciprocating article transfer device.

As discussed above, the flexibility of the vacuum cup(s) 17 allows for the upward and bottom first outward motion of the rigid articles 13. Alternatively, however, and as shown in FIG. 19, the article transfer assembly 14 may be constructed to cause the movement of article 13 as described with respect to FIG. 18 without requiring a flexible vacuum cup 17. As shown, pivot arm 65 of the article transfer assembly 14 has a cam track 66 which is shown to be of an elongated, linear configuration. By providing a cam track having an angled or sloped portion at its end 71, as shown in FIG. 20, the movement of the vacuum cup(s) will simulate the motion of the front article 13 as described. Thus, the non-linear portion of the cam track 71 will, upon removal of the article, initially cause the vacuum cup to move in an upward motion to move the article into the retention structure of the release assembly. The non-linear portion of the cam track 71 causes the vacuum cup to be moved downward upon its approach to the exit end of the magazine. Upon engaging the article 13, the vacuum cup is then moved upwardly before initiating its motion away from the magazine. Alternatively, as shown in FIG. 21, when a linear cam track 66 is utilized, the cam 72 is moved at a predetermined time as shown by arrow 73 to cause the pivot arm 65 to move in a direction as shown with respect to arrow 62. The latter cooperating structures would, therefore, result in a more precise placement of articles by the article transfer assembly 14 to thereby reduce the stress on the vacuum cup(s) and would be particularly suited for use with articles 13 which are sensitive to scuffing or damage.

As many changes are possible to the embodiments of this invention utilizing the teachings thereof, the descriptions above, and the accompanying drawings should be interpreted in the illustrative and not the limited sense.

That which is claimed:

1. A magazine release assembly for use in the separation and removal of successive rigid articles from an article stack stored in an article supply magazine having an exit end with a top and a bottom, comprising:

(a) an upper clip assembly having an elongated body with an upwardly extending article retention structure having a predetermined upward retention distance, said upper clip assembly further having an abutment member and an upper product clip structure spaced a predetermined distance from said abutment member;

(b) a lower clip assembly comprising an upwardly extending member having a terminal portion extending upwardly a predetermined distance, said terminal portion comprising a rounded interiorly disposed surface portion positioned at the bottom of the magazine exit end, said rounded surface portion for engaging the bottom of the rigid article during removal; and (c) said upper clip assembly and said lower clip assembly being constructed and arranged to form an open and unimpeded area at the article supply magazine exit end, whereby, the front rigid articles in the magazine are successively removed therefrom in an upward and bottom first outward manner while retaining the remaining stack of articles therein.

2. The magazine release assembly of claim 1, wherein said article retention structure of said upper clip assembly is spacially aligned with said lower clip assembly.

3. The magazine release assembly of claim 1, wherein said supply magazine has outside upper peripheral corners and lower peripheral corners and wherein one said upper clip assembly is mounted in each outside upper peripheral corner of said magazine and wherein one said lower clip assembly is mounted in each lower peripheral corner of said magazine.

4. The magazine release assembly of claim 1, wherein said upper product clip structure of said upper clip assembly has an angled terminal portion for facilitating the removal of successive articles from said magazine.

5. The magazine release assembly of claim 1, further comprising a roller assembly mounted on the bottom of the article supply magazine, said roller assembly being horizontally aligned with said lower clip assembly.

6. The magazine release assembly of claim 1, wherein said lower clip assembly is constructed of a nylon material and wherein said upper clip assembly is constructed of a stainless steel alloy.

7. The magazine release assembly of claim 1, wherein said upper clip assembly and said lower clip assembly are adjustably mounted to said article supply magazine.

8. The magazine release assembly of claim 1, wherein an article transfer mechanism is provided for use with said article supply magazine, said article transfer mechanism having vacuum pickup means and being constructed and arranged to engage successive articles and move said articles upwardly into said article retention structure before removing said articles from said magazine.

9. A magazine assembly for storing rigid articles and for positioning successive rigid articles for removal therefrom, comprising:

(a) a magazine structure having a frame structure terminating at an output end and further having an upper and a lower frame member;

(b) at least one upper clip assembly having means for mounting said clip assembly to said upper frame member of said magazine structure, said upper clip assembly having an elongated body member for mounting generally perpendicular to said output end of said magazine structure and having a terminating abutment surface extending upwardly a predetermined distance from the bottom of said elongated body member, and an adjustable guide bar spaced a predetermined distance parallely from said abutment surface, said adjustable guide bar further having a tip portion sloping outward from said output end; and (c) at least one lower clip assembly having means for adjustably mounting said at least one lower clip assembly to said lower frame member of said magazine structure, said lower clip assembly being a generally rectilinear member having an inwardly facing upper rounded edge for engaging the bottom portion of a rigid article and extending upwardly from said lower frame member, whereby the rigid articles are caused to be moved in an upward and outward manner by said magazine structure when removed therefrom.

10. The magazine assembly of claim 9, wherein said elongated body member and said adjustable guide bar structure of said at least one upper clip assembly is comprised of a unitary structure.

11. The magazine assembly of claim 9, wherein said at least one upper and lower clip assemblies are vertically aligned with respect to each other.

12. The magazine assembly of claim 9, wherein said at least one lower clip assembly is constructed of a nylon material and wherein said at least one upper clip assembly is constructed of a stainless steel alloy.

13. The magazine assembly of claim 9, further comprising at least one second upper clip assembly and at least one second lower clip assembly.

14. The magazine assembly of claim 9, further comprising a roller assembly mounted on the bottom of the magazine structure, said roller assembly being horizontally aligned with said at least one lower clip assembly.

15. In a magazine assembly having a frontal peripheral frame with a top bracket and a lower bracket, an article release assembly for dispensing rigid articles comprising:

(a) an upper clip assembly mounted to said top bracket and having an upper retention structure with a retention slot extending upwardly a predetermined distance and an upper clip structure, said upper clip structure being mounted to said top bracket and positioned a predetermined distance forward of said upper retention structure, said upper clip structure having a downwardly extending terminal end curved away from said top bracket; and (b) a lower clip assembly mounted to said lower bracket and having an upwardly disposed rounded edge positioned toward said peripheral frame of said magazine assembly, said lower clip assembly being constructed and arranged for sliding movement thereon by the bottom of the rigid articles.

16. The article release assembly of claim 15, wherein said upper clip assembly and said lower clip assembly are adjustably mounted to the peripheral frame of the magazine assembly.

17. The article release assembly of claim 15, wherein said retention slot of said upper clip assembly is aligned with said upwardly disposed rounded edge of said lower clip assembly.

18. The article release assembly of claim 15, wherein said upper clip assembly and said lower clip assembly are adjustably mounted to said top bracket and said lower bracket, respectively, of said peripheral frame.

19. The article release assembly of claim 15, wherein said upper clip assembly is constructed of a stainless steel alloy and said lower clip assembly is constructed of a nylon material.

20. The article release assembly of claim 15, wherein said top bracket of said frontal peripheral frame has at least one upper clip assembly mounted at the outer periphery thereof and wherein a cooperating lower clip assembly is mounted on said lower bracket in vertical alignment with each said upper clip assembly.

* * * * *